(12) United States Patent
Desai et al.

(10) Patent No.: US 8,613,099 B2
(45) Date of Patent: Dec. 17, 2013

(54) SYSTEM FOR AND METHOD OF DYNAMIC EXTENSION ASSIGNMENT

(75) Inventors: Prashant B. Desai, Land O'Lakes, FL (US); Mayuresh M. Hegde, Irving, TX (US); Juan M. Vasquez, Gibsonton, FL (US); Parind S. Poi, Lewisville, TX (US); Haridas Bhogade, Plant City, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 298 days.

(21) Appl. No.: 12/823,849

(22) Filed: Jun. 25, 2010

(65) Prior Publication Data

US 2011/0321178 A1 Dec. 29, 2011

(51) Int. Cl.
*G06F 17/30* (2006.01)
*G06F 7/04* (2006.01)
*H04N 7/16* (2011.01)
*G06F 15/173* (2006.01)
*G06F 11/00* (2006.01)
*G01R 31/08* (2006.01)
*G08C 15/00* (2006.01)

(52) U.S. Cl.
USPC .............. 726/26; 370/252; 709/223; 709/226

(58) Field of Classification Search
USPC ............... 709/223–226, 230–232; 726/27–32
See application file for complete search history.

(56) References Cited

U.S. PATENT DOCUMENTS

| | | | |
|---|---|---|---|
| 7,849,511 B2* | 12/2010 | Richardson et al. | 726/26 |
| 2006/0294019 A1* | 12/2006 | Dayan et al. | 705/59 |
| 2007/0002762 A1* | 1/2007 | Matsumoto et al. | 370/252 |
| 2007/0159979 A1* | 7/2007 | Butler et al. | 370/244 |
| 2010/0205303 A1* | 8/2010 | Chaturvedi et al. | 709/226 |
| 2011/0023123 A1* | 1/2011 | King et al. | 726/26 |

* cited by examiner

*Primary Examiner* — Evans Desrosiers
*Assistant Examiner* — Ashokkumar Patel (57) ABSTRACT

A system for and method of system for performing dynamic extension assignment is presented. In one exemplary embodiment, the method may comprise receiving, via a network, an extension assignment request associated with a network endpoint, identifying the network endpoint based on one or more properties of the network endpoint, applying one or more rules to identify an extension to be assigned to the network endpoint based on the one or more properties of the endpoint, and assigning the extension to the network endpoint.

26 Claims, 5 Drawing Sheets

SYSTEM FOR AND METHOD OF DYNAMIC EXTENSION ASSIGNMENT

BACKGROUND INFORMATION

Extensions for multimedia communications may be assigned to network endpoints in packet switching networks. These extensions are statically assigned and are associated with a device. Assignment of extensions is used by many applications to regulate usage of multimedia applications. For example, a Voice Over IP ("VOIP") based application, such as a call center application, may limit logged-in users to those with licenses. The licenses are associated one a one-to one basis with extensions. Because extensions are assigned to a device statically, a license is assigned to every terminal in a call center even though a much lower number of terminals are in use at any one point in time. Assigning an extension to every terminal prevents administrators from having to reassign statically assigned extensions among terminals to provide a license; however, it results in having to purchase significantly more licenses than are required at any one point in time. Additional applications, for example, video conferencing, are also assigned extensions and licenses for each terminal regardless of the total number of terminals used at any one time.

BRIEF DESCRIPTION OF THE DRAWINGS

The present invention, together with further objects and advantages, may best be understood by reference to the following description taken in conjunction with the accompanying drawings, in the several figures of which like reference numerals identify like elements, and in which.

DETAILED DESCRIPTION OF PREFERRED EMBODIMENTS

Network devices are frequently assigned extensions for application purposes. An extension may be used to track licensed users of an application, such as, for example, a call center application or a video conferencing application. A network using a SIP (Session Initiation Protocol) protocol for Voice Over IP or H.323 for multimedia may assign an extension to a network endpoint such as a terminal or other network device. The extension may be dynamically assigned.

According to one or more embodiments, the method may comprise receiving, via a network, an extension assignment request associated with a network endpoint, identifying the network endpoint based on one or more properties of the network endpoint, applying one or more rules to identify an extension to be assigned to the network endpoint based on the one or more properties of the endpoint, and assigning the extension to the network endpoint.

Figure 1:
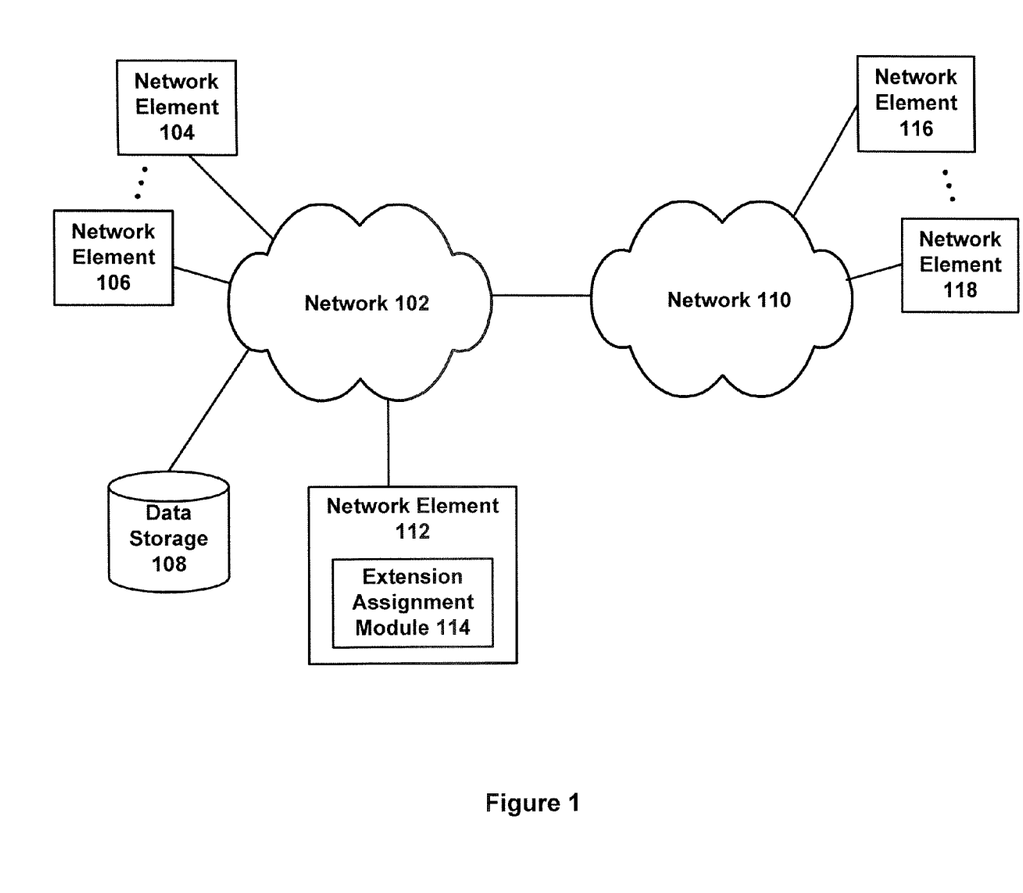
FIG. 1 is a schematic diagram illustrating a system for performing dynamic extension assignment, according to a particular embodiment.

FIG. 1 is a schematic diagram illustrating a system for performing dynamic extension assignment according to a particular embodiment. As illustrated, network 102 may be communicatively coupled with one or more devices including network element 104, network element 106, data storage 108, and network element 112. Network element 112 may contain extension assignment module 114. Network 110 may be communicatively coupled to network element 116 and network element 118. Other devices may be communicatively coupled with networks 102 and 110 via one or more intermediary devices.

The description below describes network elements, computers, and components of a system of and method for performing dynamic extension assignment that may include one or more modules. As used herein, the term "module" may be understood to refer to computing software, firmware, hardware, and various combinations thereof. Modules however are not to be interpreted as software which is not implemented on hardware, firmware, or recorded on a processor readable recordable storage medium (i.e., modules are not software per se). It is noted that the modules are exemplary. The modules may be combined, integrated, separated, and duplicated to support various applications. Also, a function described herein as being performed at a particular module may be performed at one or more other modules and by one or more other devices instead of or in addition to the function performed at the particular module. Further, the modules may be implemented across multiple devices and other components local or remote to one another. Additionally, the modules may be moved from one device and added to another device, and may be included in both devices.

Networks 102 and 110 may be one or more of a wireless network, a wired network or any combination of wireless network and wired network. For example, networks 102 and 110 may include one or more of a fiber optics network, a passive optical network, a cable network, an Internet network, a satellite network (e.g., operating in Band C, Band Ku or Band Ka), a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11n and 802.11g or any other wired or wireless network for transmitting and receiving a data signal. In addition, networks 102 and 110 may include, without limitation, telephone line, fiber optics, IEEE Ethernet 802.3, a Wide Area Network ("WAN"), a Local Area Network ("LAN"), or a global network such as the Internet. Also, networks 102 and 110 may support, an Internet network, a wireless communication network, a cellular network, or the like, or any combination thereof. Networks 102 and 110 may further include one, or any number of the exemplary types of networks mentioned above operating as a stand-alone network or in cooperation with each other. Networks 102 and 110 may utilize one or more protocols of one or more network elements to which it is communicatively coupled. Networks 102 and 110 may translate to or from other protocols to one or more protocols of network devices. Although networks 102 and 110 are each depicted as a single network, it should be appreciated that according to one or more embodiments, network 102 and network 110 may each comprise a plurality of interconnected networks, such as, for example, a service provider network, the Internet, a broadcaster's network, a cable television network, a corporate network, and a home network.

Network elements 104, 106, 112, 116, 118, and data storage 108 may transmit and receive data to and from networks 102 and 110 such as, for example, VOIP data, videoconferencing data, multimedia data, and other data. The data may be transmitted and received utilizing a standard telecommunications protocol or a standard networking protocol. For example, one embodiment may utilize Session Initiation Protocol ("SIP"). In other embodiments, the data may be transmitted and received utilizing H.323. In yet other embodiments, data may also be transmitted and received using Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet ("TCP/IP") Protocols, or other protocols and systems suitable for transmitting and receiving broadcast or parallel search data. Data may be transmitted and received wirelessly or may utilize cabled network or telecom connections such as an Ethernet RJ45/Category 5 Ethernet connection, a fiber connection, a traditional phone wireline connection, a cable connection or other wired network connection. Networks 102 and 110 may use standard wireless protocols such as, for example, IEEE 802.11a, 802.11b 802.11g, and 802.11n. Networks 102 and 110 may also use protocols for a wired connection, such as IEEE Ethernet 802.3.

Network elements 104, 106, 112, 116, and 118, and data storage 108 may include one or more processors for recording, transmitting, receiving, and storing data. Although network elements and data storage 108 are depicted as individual elements, it should be appreciated that the contents of one or more of a network element and data storage 108 may be combined into fewer or greater numbers of devices and may be connected to additional devices not depicted in FIG. 1. Furthermore, the one or more devices may be local, remote, or a combination thereof to a first network element and data storage 108.

Data storage 108 may be network accessible storage and may be local, remote, or a combination thereof to network elements 104 and 106. Data storage 108 may utilize a redundant array of inexpensive disks ("RAID"), tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), or other computer accessible storage. In one or more embodiments, Data storage 108 may be a database, such as an Oracle database, a Microsoft SQL Server database, a DB2 database, a MySQL database, a Sybase database, an object oriented database, a hierarchical database, or other database. Data storage 108 may utilize flat file structures for storage of data.

According to some embodiments, data storage 108 may be a relational database that may store extension data, endpoint data, license data, business rules, license rules, and data associated with license usage. Data may be aggregated, sorted, processed, and queried to identify one or more of extensions, licenses, network endpoints, extension usage, business rules, domain information, gateway information, gatekeeper information, Multipoint Control Unit ("MCU") information, Session Border Controller ("SBC") information, or other network information. According to some embodiments, data storage 108 may provide one or more APIs or other interfaces which may be used by a server or another network element to access or distribute information.

Network elements 104 and 106 may be one or more servers (or server-like devices), such as a Session Initiation Protocol ("SIP") server. Network elements 104 and 106 may include one or more processors (not shown) for recording, transmitting, receiving, and storing data. According to one or more embodiments, network elements 104 and 106 may contain SNMP (Simple Network Management Protocol) Managers and other network management tools. Network elements 104 and 106 may be servers of a service provider, the Internet, a broadcaster, a cable television network, or another media provider. According to some embodiments network element 104 may be a Domain Name Server (DNS), a gateway, or other network infrastructure.

Network elements 104 and 106 may provide Application Programming Interfaces ("APIs"), interface tables, Remote Procedure Calls ("RPCs"), web services, Extensible Markup Language ("XML") based interfaces, Simple Object Access Protocol ("SOAP") based interfaces, Common Object Request Broker Architecture ("CORBA") and other interfaces for sending or receiving media searches, preferences or other information.

According to some embodiments, network elements 116 and 118 may be clients or endpoints. Network elements 116 and 118 may be wireline phones, cellular phones, mobile phones, Personal Digital Assistants (PDAs), handheld MP3 players, handheld video players, personal media players, gaming devices, or other devices capable of communicating with network 110. Network elements 116 and 118 may be desktop computers, laptop computers, servers, or other computers capable of sending and receiving network signals. Network elements 116 and 118 may use wired or wireless connections. According to one or more embodiments, network elements 116 and 118 may connect to network 110 using a wireless connection and may authenticate with a network using Wired Equivalent Privacy, Wi-Fi Protected Access or other wireless network security standards.

According to one or more embodiments, network element 112 may be a gateway, a gatekeeper, a Session Border Controller, a Multi-Point Control Unit (MCU), or another network element capable of capable of receiving and responding to endpoint extension requests. According to some embodiments, network element 112 may be an application server such as, for example, a server providing call center functionality, video conferencing functionality or other multimedia application functionality using H.323, SIP, or other technologies for assignment of an extension to an endpoint.

According to some embodiments, extension assignment module 114 may perform or facilitate one or more dynamically assigning one or more endpoint extensions. Extension assignment module 114 may receive, via a network, an extension assignment request associated with a network endpoint. Extension assignment module 114 may identify a network endpoint associated with an extension assignment request. Extension assignment module 114 may assign an extension based on one or more properties associated with an network endpoint. For example, an extension assignment request may contain one or more properties of the network endpoint such as an IP address, a domain name, a host name, a MAC ("Media Access Control") address, and a network name. Extension assignment module 114 may apply one or more rules to identify an extension to be assigned to the network endpoint based on the one or more properties of the endpoint, such as the domain name associated with a network endpoint. A domain name or other property identified by information provided with an extension assignment request may be used by extension assignment module 114 to determine a location of an endpoint. Based on the location of the endpoint, extension assignment module 114 may apply one or more business rules to map the endpoint to an extension.

Endpoints may be limited to certain pools of extensions for domains, networks, hosts, or other logical or physical network delineations. Extension assignment module 114 may manage one or more pools of extensions which may be databases, lists, flat files, hierarchal files, a queue, a stack, an associative array, or other data structure or storage. For example, extension assignment module 114 may use data storage 108 to store one or more pools of extensions. Once an extension is assigned to an endpoint an indicator or flag in a pool may be set to indicate that the extension is in use. Once an endpoint no longer is using an extension (e.g., an endpoint logs out of an application or a network) the extension may be freed up. For example, extension assignment module 114 may receive a notification that endpoint has is no longer using an extension and may mark an indicator or a flag in an extension pool to indicate the availability of the extension. According to some embodiments, logs or other data structures may track usage of an extension such as, for example, timestamps associated with extension and an endpoint identifiers indicating the assignment of an extension to an endpoint and the freeing of an extension from an endpoint. Such logs or other data structures may be separate from or integrated with an extension pool and may be used for billing, security, planning, or other purposes.

According to some embodiments, extension assignment module 114 may manage assignments of extensions on a network using one or more SIP protocols. Extension assignment module 114 may reside on, be integrated with, or be communicatively coupled to one or more SIP network elements such as, for example, a Session Border Controller. Extension assignment module 114 may use session information and SIP messages provided by a SIP network element, such as for example a Session Border Controller, to handle one or more portions of endpoint extension assignment functionality. According to some embodiments, extension assignment module 114 may be integrated with other network components or may be separate from network components. Extension assignment module 114 may be a portion of an application which may be communicatively coupled to a SIP network element or other network element for one or more application purposes (e.g., licensing, security, capacity management).

According to some embodiments, extension assignment module 114 may manage assignments of extensions on a network using one or more H.323 protocols. Extension assignment module 114 may reside on, be integrated with, or be communicatively coupled to one or more network elements on an H.323 based network such as, for example, a gatekeeper or gateway. Extension assignment module 114 may be a portion of an application which may be communicatively coupled to a H.323 network element or other network element for one or more application purposes (e.g., licensing, security, capacity management).

Other network protocols may be used to implement dynamic extension assignment.

According to some embodiments, extension assignment module 114 may be a portion of an application such as, for example, a Voice Over IP application, a video conferencing application, call center user management, software licensing, or for other application functionality. Extension assignment module 114 may be used to monitor usage of an application by tracking assignment of extensions to endpoints The various components of system 100 as shown in FIG. 1 may be further duplicated, combined and integrated to support various applications and platforms. Additional elements may also be implemented in the systems described above to support various applications.

Figure 2:
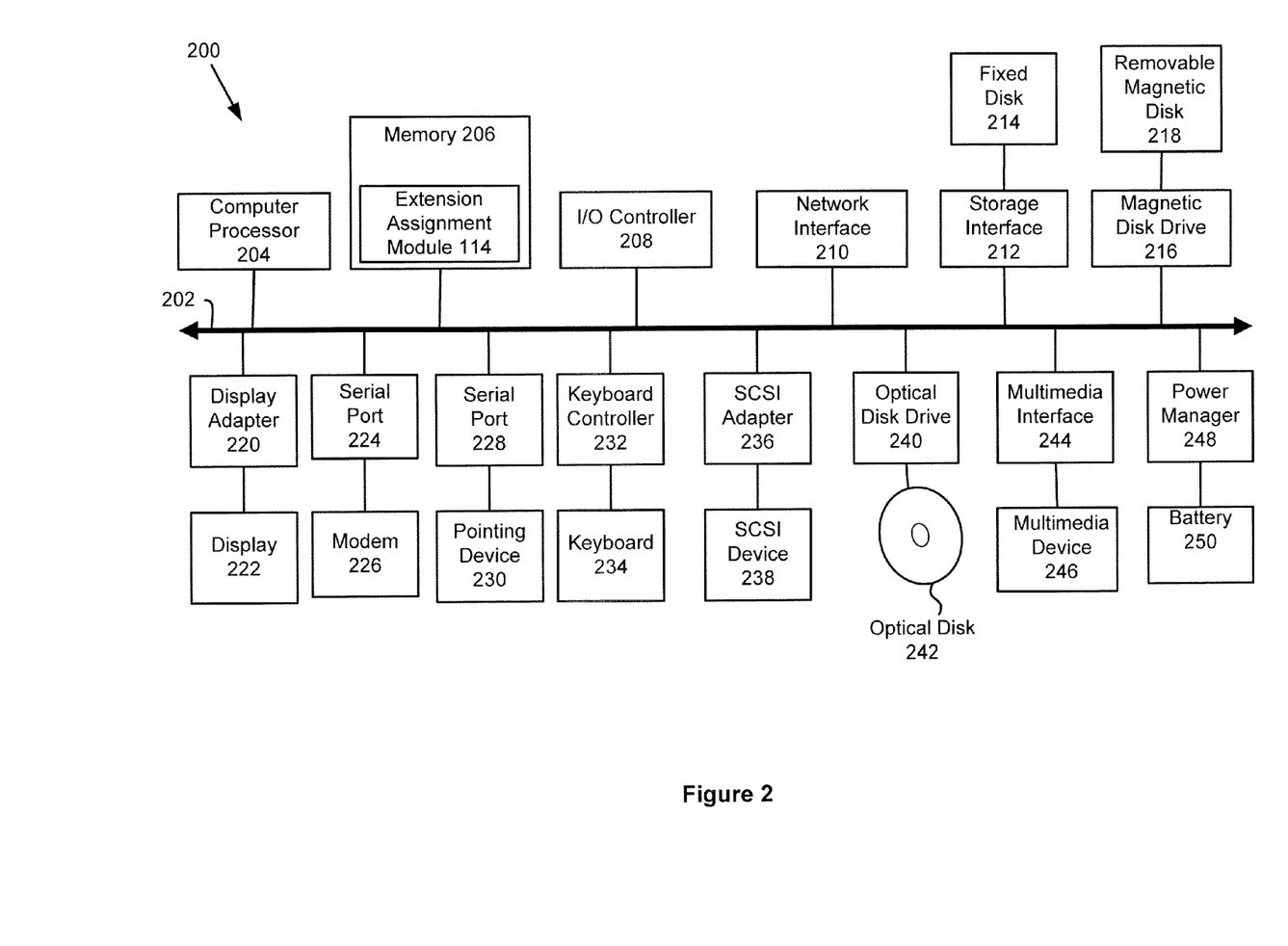
FIG. 2 depicts a block diagram of a computer system, according to a particular embodiment

FIG. 2 depicts a block diagram of a computer system 200 in accordance with an embodiment. Computer system 200 may be suitable for implementing techniques in accordance with one or more embodiments. Computer system 200 may be a client, a server, a network node, a gateway, or other network capable processing platform. Computer system 200 may include a bus 202 which may be communicatively coupled to one or more components of computer system 200, such as, for example, computer processor 204, memory 206 (e.g., RAM (Random Access Memory), ROM (Read Only Memory), flash RAM, etc.), Input/Output (I/O) controller 208, network interface 210, storage interface 212 providing connectivity fixed disk 214, magnetic disk drive 216 operative to receive removable magnetic disk 218, display 222 connected via display adapter 220, serial ports 224 and 228, keyboard 234 via keyboard controller 232, SCSI adapter 236 operative to connect to SCSI device 238 (e.g., storage, a scanner, etc.), optical disk drive 240 operative to receive an optical disk 242, and multimedia device 246 (e.g., a speaker, a camera, a microphone, etc.) coupled via multimedia interface 244. Other components may include pointing device 230 (e.g., a mouse, trackball, joystick, etc., coupled to bus 202 via serial port 228), a modem 226 (coupled to bus 212 via serial port 224), power manager 248, and battery 250.

Bus 202 may allow data communication between computer processor 204 and memory 206 and one or more other components. According to some embodiments, memory 206 may be the main memory into which an operating system and one or more application programs may be loaded. Applications or other software may be stored on and accessed via a computer readable medium, such as a hard disk drive (e.g., fixed disk 214), an optical drive (e.g., optical drive 240), a magnetic disk drive 216, or other storage medium (e.g., network accessible storage accessed via network interface 210). For example, extension assignment module 114 may be resident in memory 206.

Storage interface 212 may connect to a standard computer readable medium for storage and retrieval of information, such as a fixed disk drive 214. Fixed disk drive 214 may be a part of computer system 200 or may be separate and accessed through other interface systems. Modem 226 may provide a direct connection to a remote server via a telephone link or to the Internet via an internet service provider (ISP). Network interface 210 may provide a direct connection to a remote server via a direct network link to the Internet via a POP (point of presence).

Other devices or components may be connected in a similar manner (e.g., digital cameras, Uninterruptable Power Supplies, etc). The components of FIG. 2 are not required and one or more of the illustrated components may not be present in an embodiment. In some embodiments, multiple components of a same type may be included (e.g., multiple computer processors 204, multiple storage interfaces 212, etc.). The devices and subsystems may be interconnected in different ways from that shown in FIG. 2. Code to implement one or more embodiments may be stored in computer-readable storage media such as one or more of memory 206, fixed disk 214, optical disk 242, or removable magnetic disk 218. Code to implement the one or more embodiments may also be received via one or more interfaces and stored in memory. The operating system provided on computer system 200 may be MS-WINDOWS®, UNIX®, Linux®, Mac OS®, Mac OS X®, or another operating system.

Power manager 248 may monitor a power level of battery 250. According to some embodiments, battery 250 may be an Uninterruptable Power Supply (UPS) located either local to or remote from computer system 200. In such embodiments, power manager 248 may provide information about a power level of an UPS.

Figure 3:
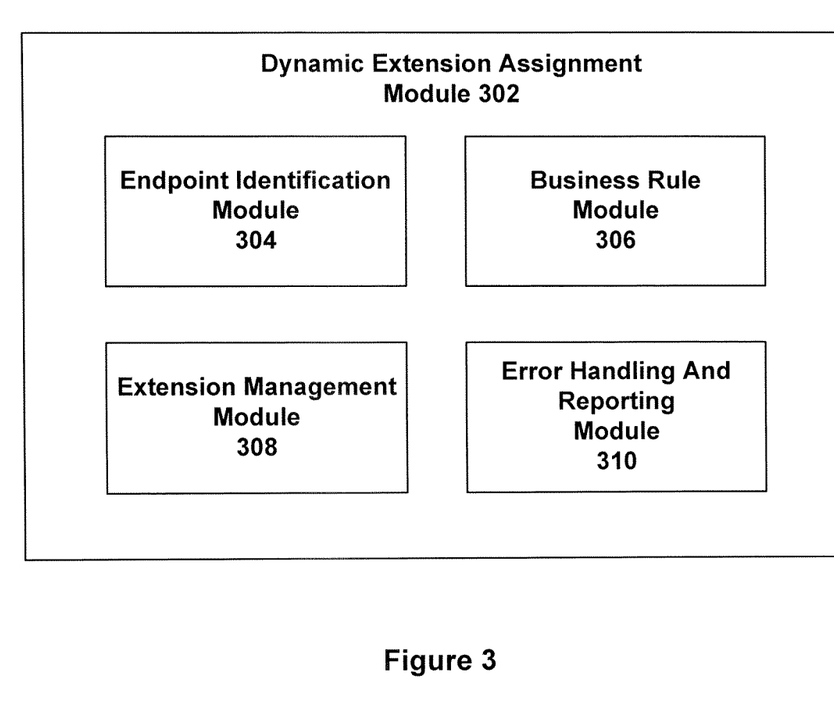
FIG. 3 is a block diagram of a module for performing dynamic extension assignment, according to a particular embodiment.

FIG. 3 is a block diagram of a hardware component of the system for performing dynamic extension assignment according to a particular embodiment. As illustrated, the dynamic extension assignment module 302 may contain one or more components including endpoint identification module 304, business rule module 306, extension management module 308, and error handling and reporting module 310. Although dynamic extension assignment module 302 is depicted as a single module, functionality or modules of dynamic extension assignment module 302 may be located on a single device or distributed across a plurality of devices including one or more centralized servers and one or more end user devices.

Endpoint identification module 304 may identify an endpoint associated with an extension assignment request. Endpoint identification module 304 may use one or more properties of the network endpoint such as an IP address, a domain name, a host name, a MAC address, and a network name to identify an endpoint. Endpoint identification module 304 may provide endpoint identification information to business rule module 306.

Business rule module 306 may apply one or more rules to identify an extension to be assigned to a network endpoint based on the one or more properties of the endpoint, such as the domain name associated with a network endpoint. A domain name or other property identified by information provided with an extension assignment request may be used by business rule module 306 to determine a location of an endpoint. Based on the location of the endpoint, business rule module 306 may apply one or more business rules to map the endpoint to an extension. Endpoints may be limited to certain pools of extensions for domains, networks, hosts, or other logical or physical network delineations. Business rule module 306 may identify an extension for an endpoint and may provide such information to extension management module 308.

Extension management module 308 may manage one or more pools of extensions which may be databases, lists, flat files, hierarchal files, a queue, a stack, an associative array, or other data structure or storage. For example, extension management module 308 may use data storage 108 to store one or more pools of extensions. Once an extension is assigned to an endpoint an indicator or flag in a pool may be set to indicate that the extension is in use. Once an endpoint no longer is using an extension (e.g., an endpoint logs out of an application, a domain, or a network) the extension may be indicated as available by extension management module 308.

Error handling and reporting module 310 may handle one or more errors associated with extension assignment to network endpoints. Error handling and reporting module 310 may provide alerts or messages to administrators in the event of an error. Error handling and reporting module 310 may produce one or more reports including diagnostic test result reports and corrective action reports. Error handling and reporting module 310 may produce log files and reports in one or more formats.

Figure 4:
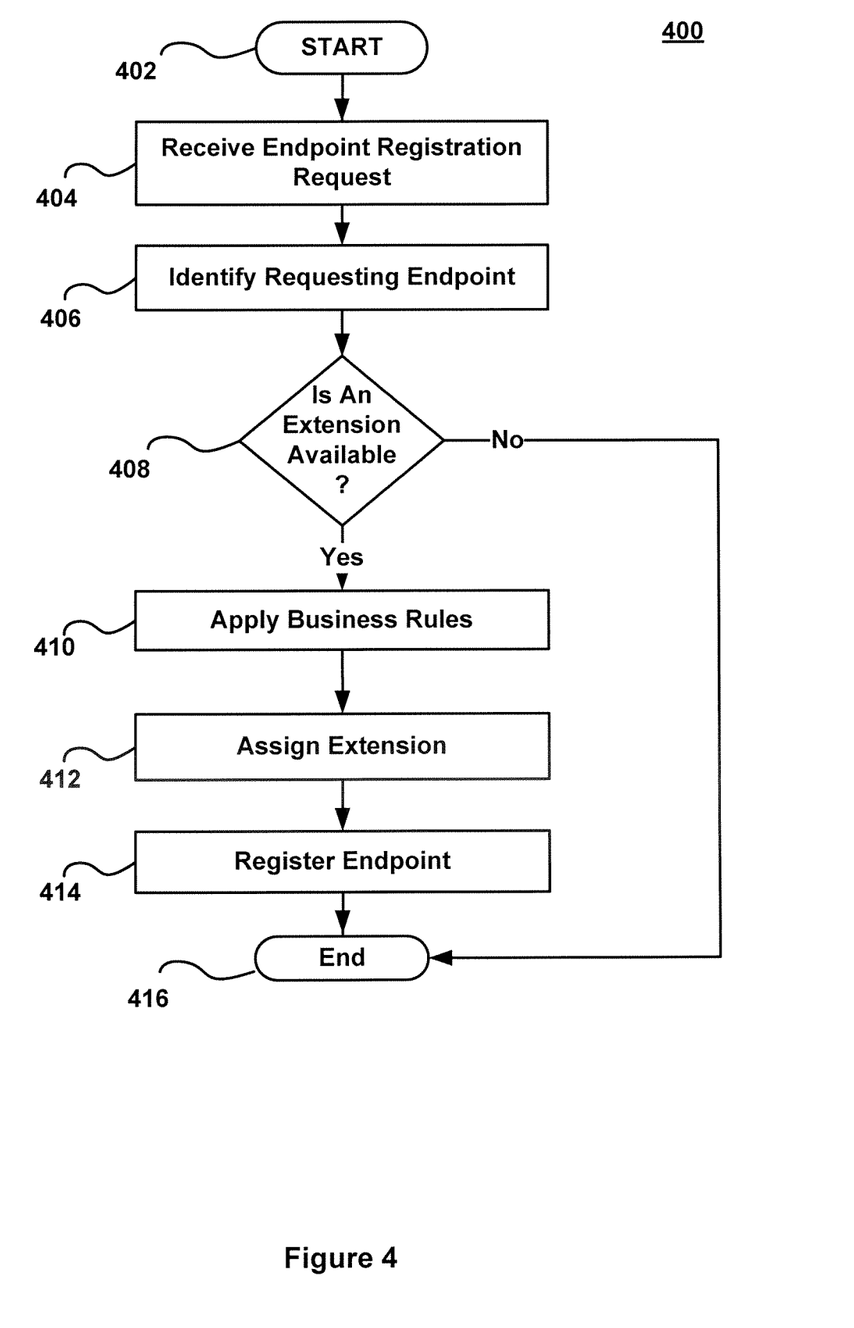
FIG. 4 depicts a method for dynamic extension assignment, according to a particular embodiment.

FIG. 4 depicts a method for dynamic extension assignment according to a particular embodiment. At block 402, the method 400 for dynamic extension assignment may begin.

At block 404, an endpoint registration request may be received. The endpoint registration request may be received by a gateway, a gatekeeper, a session border controller, an application server, or another network element. The endpoint registration request may contain information identifying one or more attributes of the requesting network endpoint such as, for example, an IP address, a domain name, a host name, a MAC address, and a network name.

At block 406, a requesting network endpoint may be identified. One or more attributes such as, for example, an IP address, may be used to identify a network endpoint. According to some embodiments, identification of an endpoint may be used to provide records or logs of usage by a network endpoint. Timestamps or other data may be used to indicate usage such as the beginning of a session, the end of a session, a duration of a session. This data may be used for billing, licensing, troubleshooting, planning, security, or other purposes. According to some embodiments, it may be sufficient to identify only a network, a domain, or a portion of a network or a domain. This information may be used to apply business rules to map a requesting endpoint to an extension.

At block 408 it may be determined whether an extension is available in one or more pools of extensions. Pools of extensions which may be databases, lists, flat files, hierarchal files, a queue, a stack, an associative array, or other data structure or storage. Once an extension is assigned to an endpoint an indicator or flag in a pool may be set to indicate that the extension is in use. Once an endpoint no longer is using an extension (e.g., an endpoint logs out of an application or a network) the extension may be indicated as available by setting one or more flags or indicators. Pools of extensions may be separated by an associated network, application, domain, or other attributes. If an extension is available for the requesting network endpoint the method may continue at block 410. If an extension is not available for the requesting network endpoint, the method may end at block 416.

At block 410, one or more business rules may be applied to map a network endpoint to an extension. Business rules may map an extension to an endpoint based on attributes associated with the network endpoint. Business may enforce or facilitate licensing rules, security rules, capacity management rules or other organization objectives. For example, a network endpoint may be associated with a client device requesting an extension for one or more of: a VOW call, a video conference, or launching a licensed application. The application of business rules may identify an extension for the network endpoint. For example, a business rule may determine which pools of extensions may be assigned to an endpoint based on a network location of the endpoint (e.g., a domain, a subnet, or an IP address). According to some embodiments, business rules may use a network endpoint priority setting as a factor in identifying an available endpoint.

At block 412, the identified extension may be assigned to the requesting network endpoint. The extension may be marked as assigned in a pool of extensions by setting a flag or other indicator. Other information may be recorded such as, for example, a network endpoint associated with the extension, date information (e.g., an assignment date and time), an associated use (e.g., VOW, an application name), and a client type (e.g., smart phone, terminal, laptop, etc.). The assignment information may be provided to the network endpoint via one or more network communications (e.g., a SIP message and an H.323 message). According to some embodiments, an application residing on a centralized network element (e.g., an application handling a VOIP call or a video conference) may be provided the assignment information and may use the assignment to provide application functionality to the network endpoint. The assignment of an extension of to a network endpoint may allow usage of a licensed application such as, for example, a call center application, by the network endpoint.

Once the an extension has been assigned to the network endpoint, the network endpoint may be registered at block 414.

At block 416, the method 400 may end.

Figure 5:
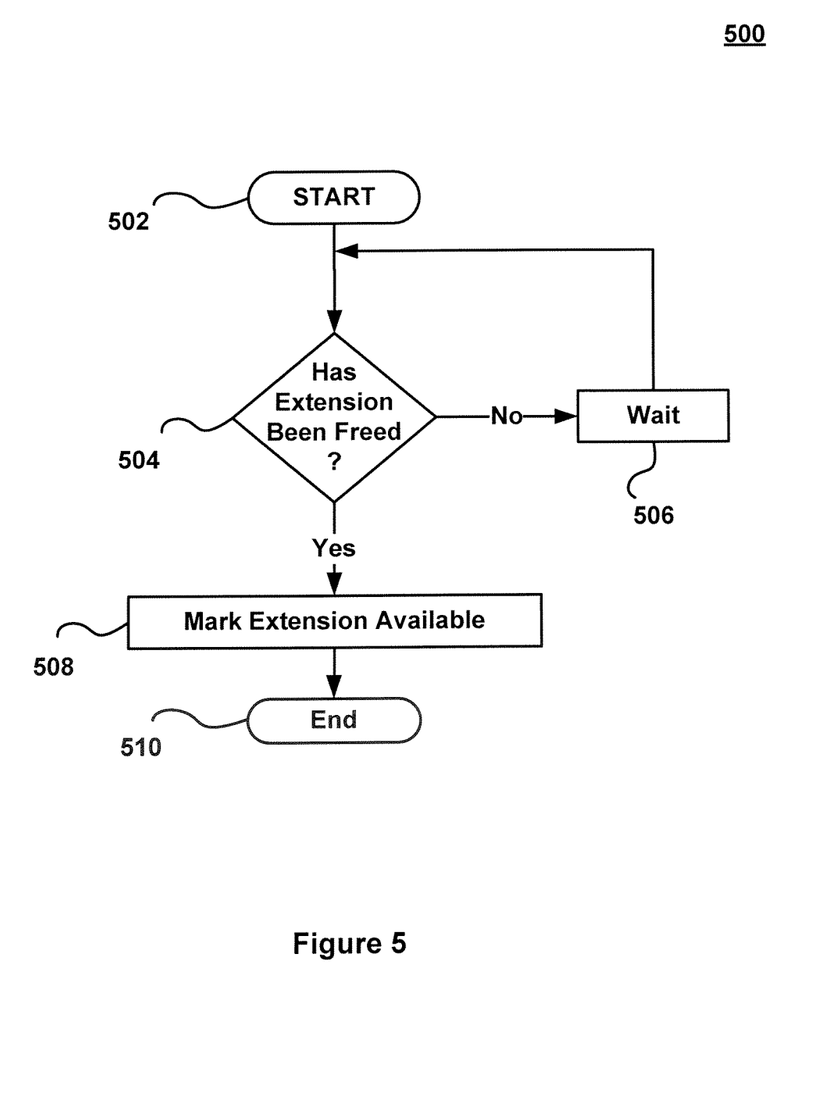
FIG. 5 depicts a method for freeing a dynamically assigned extension, according to a particular embodiment.

FIG. 5 depicts a method for freeing a dynamically assigned extension, according to a particular embodiment. At block 502, the method 500 for freeing a dynamically assigned extension may begin At block 504, the method 500 may determine if an extension has been freed. For example, a network endpoint may log out of an application or the network. A gateway, a gatekeeper, a MCU, a SBC, or another network element may receive a network communication indicating that a network endpoint has logged out, terminated a session, or another indicator that an extension is available. According to some embodiments, one or more factors may be considered when determining whether an extension is available. For example, one or more settings may determine allowable usage of an extension (e.g., a maximum length, permissible connection times, permissible connection purposes, or permissible users). If an endpoint is not meeting one or more settings determining allowable usage of an extension, the extension may be freed for use. According to some embodiments, one or more network endpoints (e.g., a host) may receive priority in assignment of an extension. If an extension is not available for a priority network endpoint, an extension may be freed from a lower priority network endpoint. If an endpoint is no longer using an extension the method may continue at block 508. If an endpoint is still using an extension, the method may wait at block 506.

At block 506, the method may wait to receive an indication that an extension is available. According to some embodiments, the method may check after a specified period of time to determine whether an extension is still in use. If a specified period of time has elapsed or an indication of extension availability has been received, the method may return to block 504.

At block 508, an indicator or a flag in an extension pool be set or unset to indicate the availability of the extension. According to some embodiments, logs or other data structures may track usage of an extension such as, for example, timestamps associated with extension and an endpoint identifiers indicating the assignment of an extension to an endpoint and the freeing of an extension from an endpoint. After freeing an extension the method may end at block 510.

It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, or combinations thereof. Moreover, the figures illustrate various components (e.g., servers, computers, etc.) separately. The functions described as being performed at various components may be performed at other components, and the various components may be combined or separated. Other modifications also may be made.

In the preceding specification, various preferred embodiments have been described with references to the accompanying drawings. It will, however, be evident that various modifications and changes may be made thereto, and additional embodiments may be implemented, without departing from the broader scope of invention as set forth in the claims that follow. The specification and drawings are accordingly to be regarded in an illustrative rather than restrictive sense.

We claim:

1. A method, comprising:
receiving, via a network, an extension assignment request associated with a network endpoint;
identifying the network endpoint based on one or more properties of the network endpoint;
applying one or more rules to identify an extension to be assigned to the network endpoint based on the one or more properties of the network endpoint, wherein the one or more rules comprises one or more business rules mapping the network endpoint to the extension based on a network location of the network endpoint, wherein the one or more business rules comprise at least one of: security rules, capacity management rules, and organization objective rules;
assigning the extension to the network endpoint;
determining that the extension is no longer in use; and
after determining that the extension is no longer in use, removing the assignment of the extension to the network endpoint.

2. The method of claim 1, wherein the one or more properties of the network endpoint comprise at least one of: an IP address, a domain name, a host name, a MAC address, and a network name.

3. The method of claim 1, wherein the network carries SIP protocol communications.

4. The method of claim 1, wherein the network carries H.323 protocol communications.

5. The method of claim 1, wherein the assignment of the extension is performed as a part of a networking protocol.

6. The method of claim 1, wherein the one or more rules comprise further one or more rules mapping the network endpoint to the extension based on the one or more properties of the network endpoint.

7. The method of claim 1, wherein the one or more rules further comprise one or more rules mapping the network endpoint to the extension based on at least one of: a domain associated with the network endpoint, a network associated with the network endpoint, an IP address associated with the network endpoint, a host associated with the network endpoint, and a MAC address associated with the network endpoint.

8. The method of claim 1, wherein the network endpoint is used for Voice Over IP communications.

9. The method of claim 1, wherein the network endpoint is used for video conferencing.

10. The method of claim 1, further comprising:
associating one or more extensions with a software license.

11. The method of claim 10, wherein the one or more rules further comprise specified licensing rules.

12. The method of claim 1, wherein the assignment of the extension is performed by at least one of: a gateway, a session border controller, and an application.

13. The method of claim 1, wherein the extension assignment request associated with the network endpoint is received when a registration request occurs for the network endpoint.

14. A non-transitory computer readable storage medium comprising code to perform the acts of the method of claim 1.

15. The method of claim 1, wherein the business rules use a network endpoint priority setting as a factor in identifying an available endpoint.

16. The method of claim 15, wherein the business rules using a network endpoint priority setting as a factor in identifying an available endpoint include removing an assignment of an extension from a lower priority network endpoint and assigning the removed extension to a higher priority network endpoint.

17. The method of claim 1, wherein the extension to be assigned to the network endpoint is a dynamically assigned extension to be used by at least one application to regulate usage of the at least one application.

18. The method of claim 17, wherein the at least one application is a multimedia application capable of providing at least one of: VoIP data, videoconferencing data, and multimedia data.

19. A system, comprising:
a network element, wherein the network element comprises one or more processors configured to:

receive, via a network, an extension assignment request associated with a network endpoint;
identify the network endpoint based on one or more properties of the network endpoint;
apply one or more rules to identify an extension to be assigned to the network endpoint based on the one or more properties of the network endpoint, wherein the one or more rules comprises one or more business rules to map the network endpoint to the extension based on a network location of the network endpoint, wherein the one or more business rules comprise at least one of: security rules, capacity management rules, and organization objective rules;
assign the extension to the network endpoint;
determine that the extension is no longer in use; and
after determining that the extension is no longer in use, remove the assignment of the extension to the network endpoint.

20. A system, comprising:
a communication module configured to receive, via a network, an extension assignment request associated with a network endpoint;
an endpoint identification module configured to identify the network endpoint based on one or more properties of the network endpoint;
a rule module configured to apply one or more rules to identify an extension to be assigned to the network endpoint based on the one or more properties of the network endpoint, wherein the one or more rules comprises one or more business rules to map the network endpoint to the extension based on a network location of the network endpoint, wherein the one or more business rules comprise at least one of: security rules, capacity management rules, and organization objective rules; and
an extension management module configured to:
assign the extension to the network endpoint;
determine that the extension is no longer in use; and
after determining that the extension is no longer in use, remove the assignment of the extension to the network endpoint.

21. The system of claim 20, wherein the one or more properties of the network endpoint comprise at least one of: an IP address, a domain name, a host name, a MAC address, and a network name.

22. The system of claim 20, wherein the network endpoint comprises a network endpoint on a network using at least one of: a SIP protocol and an H.323 protocol.

23. The system of claim 20, wherein the assignment of the extension is performed as a part of a networking protocol.

24. The system of claim 20, wherein the one or more rules further comprise one or more rules mapping the network endpoint to the extension based on at least one of: a domain associated with the network endpoint, a network associated with the network endpoint, an IP address associated with the network endpoint, a host associated with the network endpoint, and a MAC address associated with the network endpoint.

25. The system of claim 20, wherein the one or more processors are further configured to:
associate one or more extensions with a software license.

26. The system of claim 19, wherein the network element comprises at least one of: a gateway and a session border controller.

* * * * *